Feb. 26, 1963 L. HEDSTROM 3,079,458

FLEXIBLE TAPE CONDUCTORS

Filed Nov. 9, 1959 4 Sheets-Sheet 1

INVENTOR.
LARS HEDSTROM
BY Harry Thurnell
ATTORNEY

INVENTOR.
LARS HEDSTROM
BY
Harry Lommel
ATTORNEY

Feb. 26, 1963 L. HEDSTROM 3,079,458

FLEXIBLE TAPE CONDUCTORS

Filed Nov. 9, 1959 4 Sheets-Sheet 3

INVENTOR.
LARS HEDSTROM
BY
[signature]
ATTORNEY

Feb. 26, 1963 L. HEDSTROM 3,079,458

FLEXIBLE TAPE CONDUCTORS

Filed Nov. 9, 1959 4 Sheets-Sheet 4

INVENTOR.
LARS HEDSTROM
BY
Harry [signature]
ATTORNEY

United States Patent Office 3,079,458
Patented Feb. 26, 1963

3,079,458

FLEXIBLE TAPE CONDUCTORS

Lars Hedstrom, Mendham, N.J., assignor to The Thomas & Betts Co., Elizabeth, N.J., a corporation of New Jersey Filed Nov. 9, 1959, Ser. No. 851,649
6 Claims. (Cl. 174—84)

Figure 1:
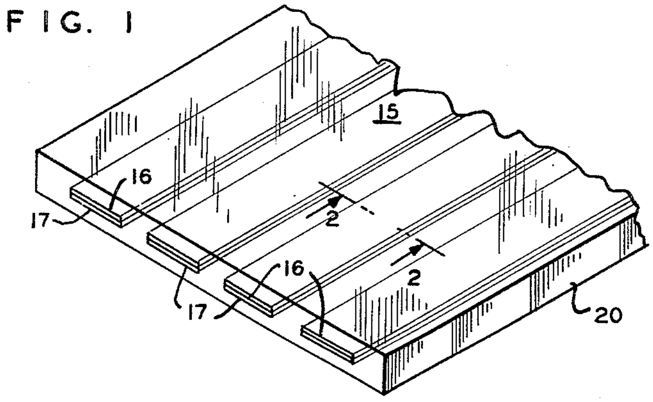

This invention relates to a tape conductor so designed as to provide a continuous interface maintained pressure-closed, sealed and dielectrically insulated from the moment of manufacture until the moment of desired connection thereof with a second conductor. The tape conductor is so formed that the conductor interface thereof may be readily made available for such connection, as below more particularly described.

The invention is adapted to be manufactured as a flexible tape wherein a plurality of conductor ribbons are provided, each having the interface mentioned, positioned medially and in axially parallel spaced relation within a dielectric sheath, the latter of transparent or translucent plastic material. Thus the assembly is highly flexible, light in weight and extremely durable in use.

The invention is adapted for use in electronic circuits and equipment, being extremely light and highly durable and lending itself readily to connection of any selected conductor interface, as below more particularly described.

The object of this invention is to provide an improved tape type of electrical conductor of either single or multiple parallel conductor or where printed circuits are embedded in such tapes. The present tapes in which a single flat ribbon of conductive material is enclosed within insulation sheaths are extremely difficult to strip for the purpose of making a connection or tap. When the insulation is abrasively or otherwise removed, the remaining thin conductor is not truly clean enough to make good electrical contact and, left unsupported, is mechanically weak. The construction of this invention provides a conductor which does not need to be stripped, presents a readily available conductor surface which is always clean, and leaves the thin conductor attached to the supporting insulation for greatly increased mechanical strength.

The drawings, illustrating procedures and devices useful in carrying out the invention, and the description below, are exemplary only of the invention, which shall be deemed to cover all other devices and procedures coming within the scope and purview of the appended claims.

Figure 2:
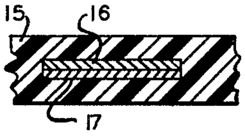
Figures 3, 4:
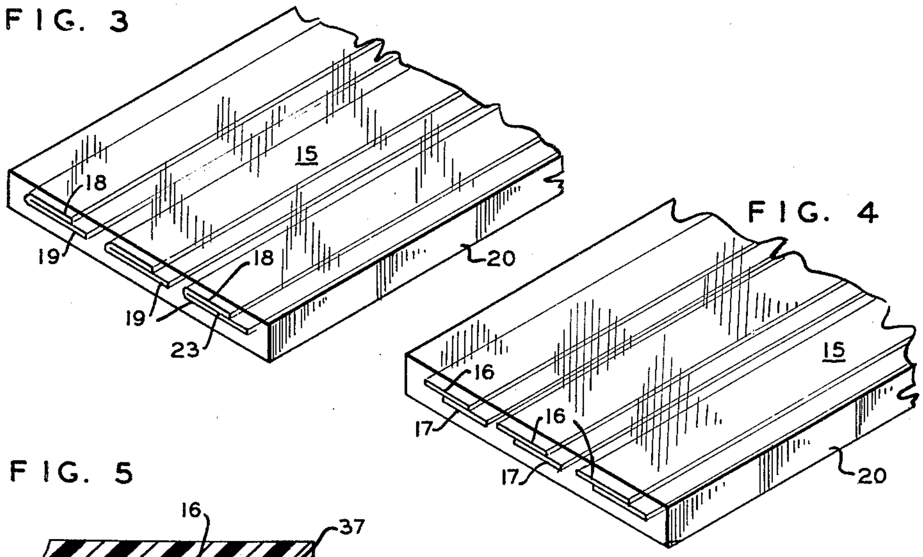
Figure 5:
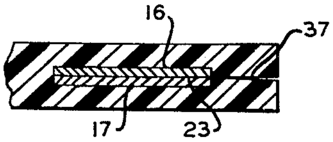
Figure 6:
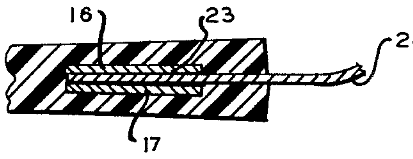
Figure 7:
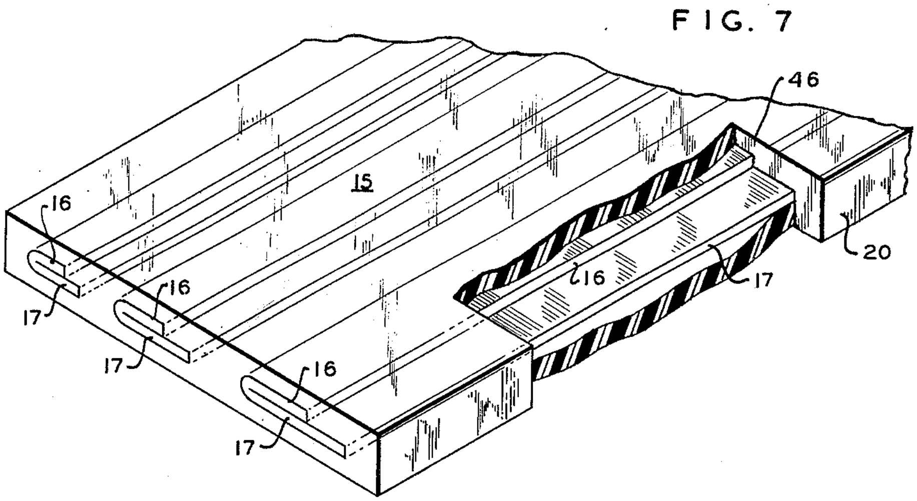
Figures 8, 9:
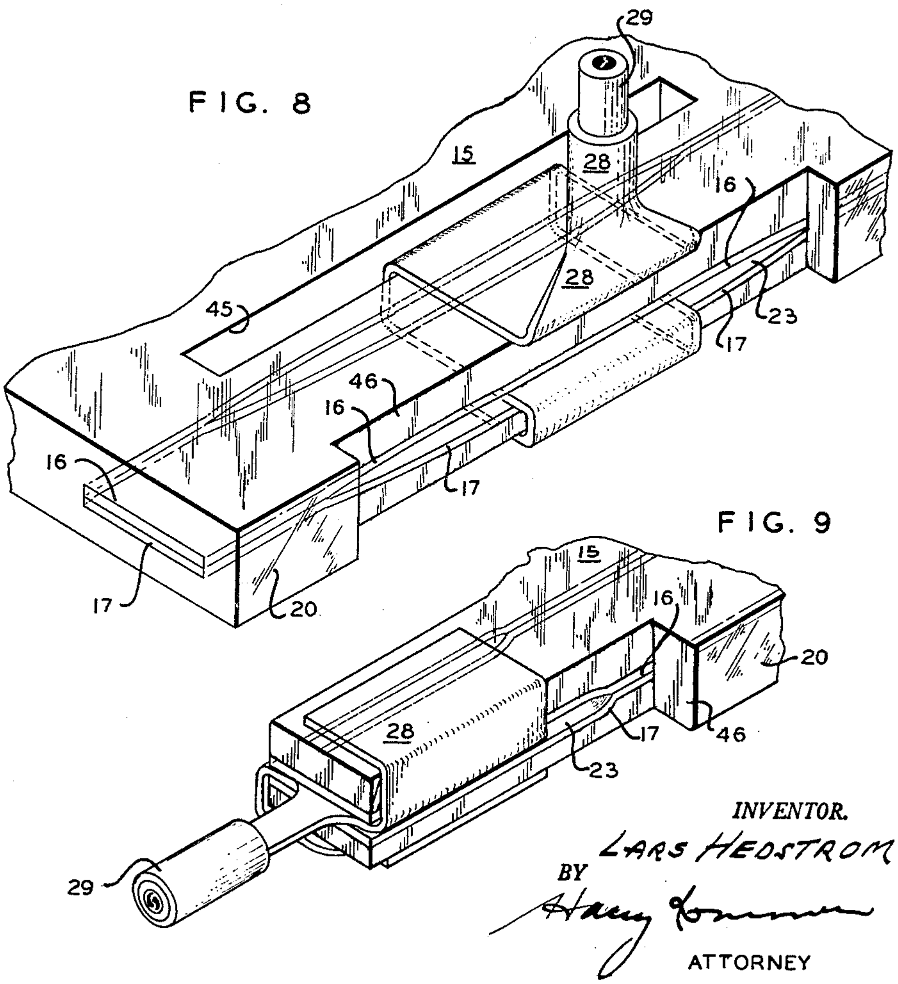
Figures 10, 11, 12, 13, 14, 15, 16, 17, 18:
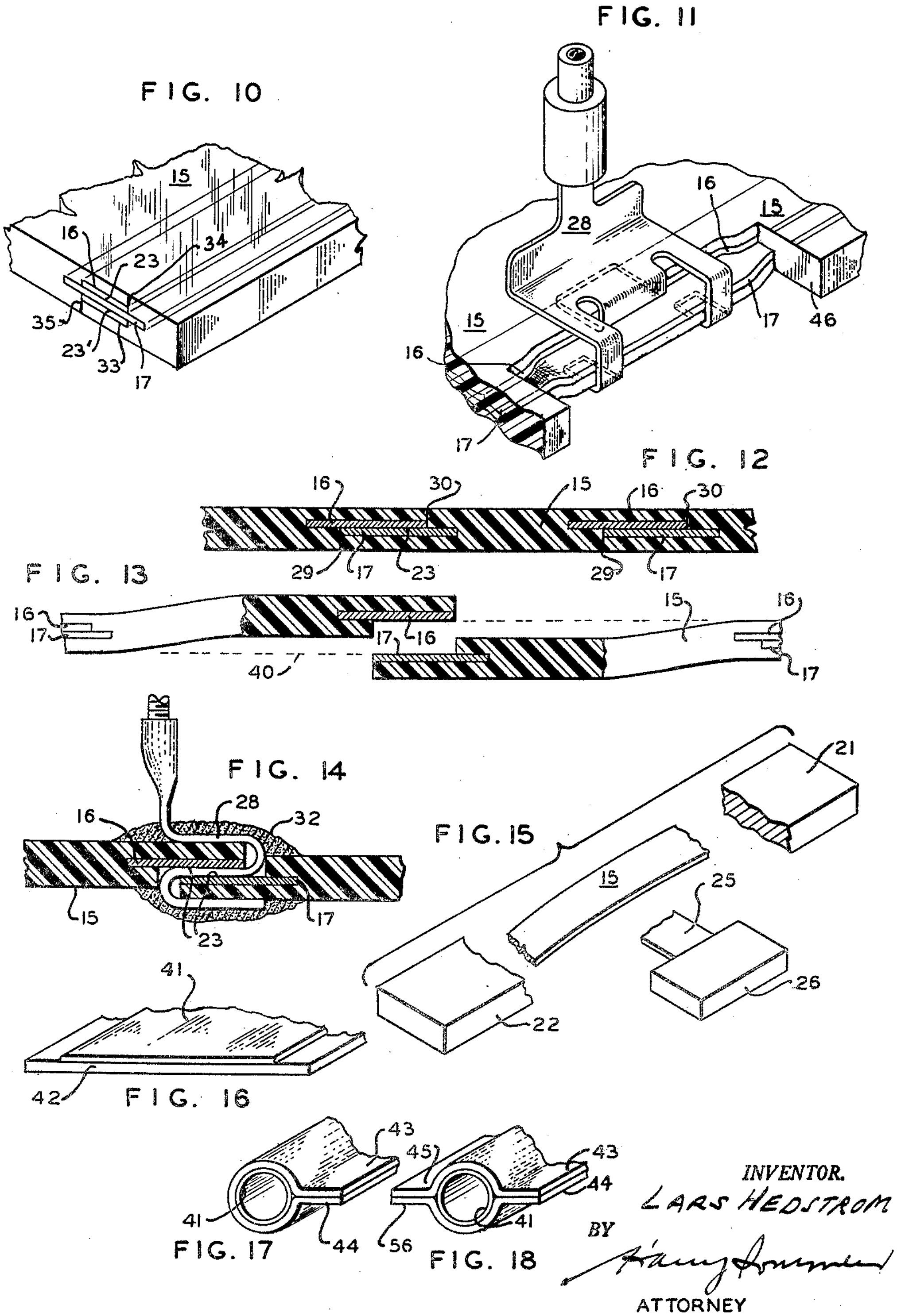
Figure 19:
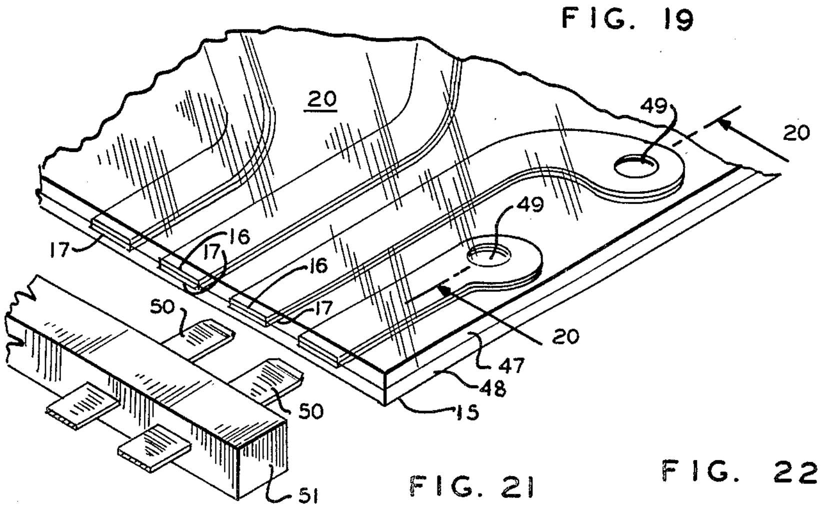
Figure 21:
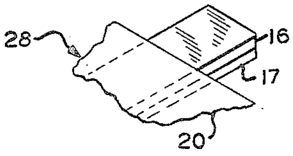
Figure 22:
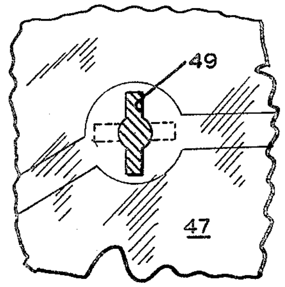
Figure 20:
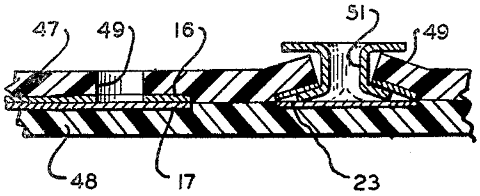
Figure 23:
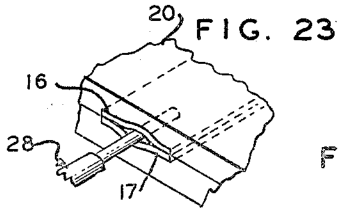
Figure 24:
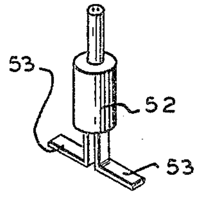
Figure 25:
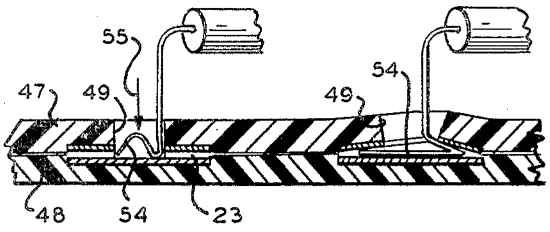

In the drawings, wherein similar reference characters indicate like parts:

FIGURE 1 is a fragmentary perspective view of a device embodying the invention,

FIGURE 2 is an enlarged, vertical, fragmentary sectional view taken at line 2—2 of FIGURE 1, FIGURES 3 and 4 are similar fragmentary, perspective views of other forms thereof, FIGURE 5 is a fragmentary sectional view, similar to FIGURE 2, but showing the dielectric sheath cut for access to the interface of the conductor ribbons, FIGURE 6 is a similar view, showing the insertion of a second conductor element at the interface of the conductor ribbons and extending from the sheath, FIGURE 7 is a fragmentary, perspective view, showing the dielectric sheath of the tape conductor cut away along a portion of one of the length of the flexible conductor ribbons, shown exposed to facilitate insertion of a second conductor element at the conductor interface after spreading of the parts, FIGURE 8 is a similar view, showing a second conductor secured to the flexible conductor ribbons, FIGURE 9 is a fragmentary, perspective view of a tape conductor embodying the invention, wherein the insulation sheath has been cut to the margins of the flexible conductor ribbons at an end of the conductor elements, the second conductor element being shown secured to the flexible conductor ribbons, FIGURE 10 is a fragmentary end elevational view of another form of tape conductor embodying the invention, FIGURE 11 is a fragmentary end elevational view, similar to FIGURE 3, showing another form of second conductor element secured to the conductor ribbons, along a side thereof, FIGURE 12 is a cross sectional view of the FIGURE 4 conductor tape, showing, at 29, 30, cuts made through the top and bottom of the conductor sheath to the interface between the conductor ribbons to facilitate separation thereof, FIGURE 13 shows the sheath of FIGURE 12 so separated, exposing the interface of the conductor ribbons for insertion therebetween of a second conductor member, parts being shown in elevation, FIGURE 14 is a sectional view, showing the second conductor member so inserted at the interface, the conductor sheath then being closed and dielectric sealing means 32 applied thereover, FIGURE 15 is a fragmentary schematic view, illustrating application of the invention to components, exemplary of an infinite variety of applications to which the invention may be put, FIGURE 16 is a fragmentary perspective view of another form of the invention, in the initial flat form of the parts, FIGURE 17 is a fragmentary perspective view showing the parts rolled to tubular form, FIGURE 18 is a similar fragmentary perspective view showing another tubular form to which the parts may be rolled, FIGURE 19 is a fragmentary perspective view of a form of the invention wherein the conductor sheath is formed of two sheets on which the conductor ribbons are deposited, said sheets being secured together to define the ribbon enclosing sheath, and further shows, separated from the sheath, a bladed connector for endwise connnection therewith, FIGURE 20 is an enlarged longitudinal sectional view taken at line 20—20 of FIGURE 19, but showing a connector element disposed in one of the apertures, FIGURE 21 is a fragmentary perspective view of the end of a tape conductor embodying another form of the invention, FIGURE 22 is a fragmentary top plan view of a sheath embodying a modified form of the invention, with a connector element shown in section, FIGURE 23 is a fragmentary perspective view showing the manner in which a cable or wire may make endwise connection with the conductor ribbons of a tape conductor embodying the invention, FIGURE 24 is a perspective view of a conductor for use in connection therewith, and FIGURE 25 is a longitudinal sectional view corresponding to FIGURE 20 but showing a different form of element (54) inserted into the aperture 49.

In all forms of the invention herein claimed, the characteristically novel feature of the invention is the formation of conductor ribbons face to face, pressure held and sealed to thus define therebetween an interface 23 within the enclosing dielectric sheath 20. The conductor ribbons are thus sealed and the interface 23 kept clean and closed while readily accessible for the connection of a second conductor therewith when, for the first time, the dielectric sheath is cut to said interface for ready access as in FIGURES 7, 8, 11, 13 and 14. The sealed conductor interface 23 is defined by elongated flexible conductor ribbons 16 and 17 held in pressed, contacting, planar face-to-face registry (FIGS. 1, 3). Said conductor ribbons may each be a single width of ribbon folded to define the flexible conductors 18, 19 pressed to planar registry, face-to-face and defining the sealed electrical conductor interface 23 therebetween or the conductor ribbons may be held in partially offset relation (FIG. 4) so that the interface is defined for only a portion of the width thereof, or (FIG. 10) more than two conductor ribbons may be so held pressed in face-to-face relation to define interfaces 23.

Dielectric sheath 20 covers the outer faces and sides of tape conductors 16, 17 (18, 19) axially positioned therein so as to be completely enveloped thereby, the interface 23 being thus sealed until it is desired to effect electrical connection of a second conductor (28) therewith. Said sheath is preferably made of flexible plastic or other dielectric material in which the flexible conductor ribbons may be (as shown in the drawings and described herein) medially axially positioned and sealed or of separate sheets on which the ribbons are deposited (FIG. 19) initially in a printing, photographic, molding or other manufacturing operation. The conductor ribbons 16, 17 may be made of any desired or convenient conducting material, such as relatively thin, long strips of copper.

The assembly is highly flexible, so that, for example, by cutting slots or slits 45 longitudinally in the enveloping sheath (FIG. 8) and marginal recess 46 to the edges of ribbons 16, 17, the conductor 15 may be flexed or manipulated to facilitate opening the interface 23 and insertion or connection of said second conductor 28. Access to the interface for that purpose may be had by cutting the sheath at the desired point as indicated at 37 (FIG. 5) from the side (FIG. 6) from top to bottom (FIG. 8) of the sheath or through the top or bottom of the sheath to the interface as indicated at 29, 30 (FIG. 12) 34, 35 (FIG. 10) and in FIGS. 20–23.

The invention is adapted for connection of electrical components such as (FIGS. 15, 19) components 21 and 22, at the ends of the flexible conductor ribbons 16, 17 (FIGS. 9 and 19) or therealong as in FIGS. 8 and 11 or for connection of a second tape conductor 25 or further components 26 therewith (FIG. 15).

Second conductor element 28 may be a flat strip (FIG. 6) or of other form inserted between and around the flexible ribbons 16, 17 (FIGS. 8 and 14) for connection of the electrical components or circuits parts therewith.

Essentially the same form of connection may be attained at the end of the conductor 15 (FIGS. 9, 19 and 23) where flexible ribbons 16, 17 may be formed in exposed relation to said end or the dielectric sheath 20 cut to the sides hereof. The second conductor elements may be inserted at the interface, the flexible sheath, tending to close, assisting in the action.

Element 28 may be threaded through and around the tape conductors 16 and 17 (FIGS. 8, 9, 11 and 14) and secured in final position by clamping the parts if desired. The insulation sheath 20 need not be completely removed from the flexible conductor ribbons as at FIGS. 7 and 8 as it is necessary to only cut through the conductor sheath to the interface 23 as in FIGS. 12, 13, or therealong as in FIGS. 8 and 11. The conductor ribbons may be separated as in FIG. 13, the second conductor element 28 inserted at the interface and the sheath again closed (dotted line 40, FIG. 13). If desired, the assembly of the second conductor element and the flexible conductor ribbons may be covered with a dielectric tape or substance 32 (FIG. 14).

FIG. 16 shows a form of invention wherein the conductor ribbon is formed as a flat strip 41 to which is secured or adhered a dielectric sheath 42 of greater width so that on rolling the parts (FIG. 17) to tubular form the ribbon strip 41 will define an internal circle or tube closed and held in sealed relation for ready insertion of a second conductor element or part thereinto for connection with another circuit or part. The portions 43, 44 of dielectric sheath 42 of greater width may be terminated at one edge as in FIG. 17 or at both edges as at 43, 44, 45, 56 of FIG. 18. Sheath 42 may be pressure sensitive, heat sensitive or otherwise adherent. This form of invention thus provides a highly efficient and useful product and a rapid and convenient means for fabricating elongated tubular sheathed conductors. FIGS. 19–23 show the invention applied to a flexible or inflexible dielectric sheath, tape or board 20 on a face of which the conductor ribbons 16, 17 are etched, printed, or photographically impressed or otherwise oppositely deposited, the sheets 47, 48 being then aligned and laminated together by heat and pressure, adhesive or other suitable means. The top sheet 47 may be pierced with apertures, slots or other openings 49, prior to or after lamination or bonding of the sheets 47, 48 to form the completed sheath 20 enclosing the conductor ribbons 16, 17. The interface 23 of conductor ribbons 16, 17 of FIG. 19 (likewise in the FIGS. 1, 3, 4, 7, 8, 9, 10 forms) may, as shown in FIG. 19, be engaged at the end of the tape or board by conductor blades 50 of a connector 51. The apertures 49 in the top sheets 47 of the sheath 20 in the FIGS. 19–23 forms may receive an expanding eyelet or other fixture 51 for connection of a second conductor therewith. In FIG. 22 the configuration of the aperture 49 of the upper sheet 47 is such as to receive a double bladed conductor 52 whch is inserted therein and then twisted a quarter turn to move the legs 53 thereof into contact with the interface 23 much as in the case of the lower end of eyelet 51 in FIG. 20. Conductor 52 may be readily disengaged and removed by turning it a quarter turn to line the legs 53 thereof with the aperture 49. In FIG. 25 the bowed preformed lead 54 may be placed in the aperture 49 and pressure applied at the point indicated by the arrow 55, against the bowed portion of the preformed lead, expanding the latter to frictionally spread into and contact the interface 23. The second conductor 28 may, as above described and shown in FIGURE 19, be one or more blades 50 of connector 51 or, as in FIGURE 21, may be the ends of conductor ribbons 16, 17 of a conductor tape whose insulation sheath 20 has been cut away at one end to expose ends of the conductor ribbons 16, 17 or, as in FIGURE 23, may be a wire or cable, in each case to be inserted intermediate the ends of the conductor ribbon for connection therewith.

Having thus described my invention, what I claim as new and desire to secure by Letters Patent is:

1. An electrical connection comprising flexible conductor ribbons positioned in contacting face to face planar registry and defining therebetween an interface, said conductor ribbons being positioned within and completely enclosed by a dielectric sheath, said sheath being cut to define a portion thereof slitted to the interface along one longitudinal edge of the conductor ribbons, a second conductor inserted through said slitted portion of said sheath and intermediate said flexible conductor ribbons at said interface and extended substantially beyond the dielectric sheath so as to enable an electrical connection to be made to said conductor ribbons from a point exteriorly of said dielectric sheath.

2. An electrical connection as set forth in claim 1, wherein the dielectric sheath is formed of plastic material.

3. An electrical connection as set forth in claim 1, wherein the conductor ribbons are offset laterally with respect to one another so that each edge of one is offset from the corresponding edge of the other.

4. An electrical connection as set forth in claim 1, wherein the second conductor is bent so that a substantial portion thereof extends beyond said interface.

5. An electrical connection as set forth in claim 4, wherein the so-extended portion of said second conductor is disposed over the sheath.

6. An electrical connection as set forth in claim 4, wherein the second conductor is formed of flat material, projects between the conductor ribbons, extends from one side thereof and out of the other side, and then bends beneath the opposite face of and against the dielectric sheath so as to lie substantially parallel to the conductor ribbons.

References Cited in the file of this patent

UNITED STATES PATENTS

| | | |
|---|---|---|
| 2,200,776 | Hoover | May 14, 1940 |
| 2,269,779 | Morten | Jan. 13, 1942 |
| 2,274,136 | Frank et al. | Feb. 24, 1942 |
| 2,284,097 | La Jone | May 26, 1942 |
| 2,308,324 | Benander | Jan. 12, 1943 |
| 2,361,721 | Van Deventer | Oct. 31, 1944 |
| 2,540,101 | Colman | Feb. 6, 1951 |
| 2,611,800 | Naughton | Sept. 23, 1952 |
| 2,700,206 | Gilbert | Jan. 25, 1955 |
| 2,757,349 | Erbal | July 31, 1956 |
| 2,802,257 | Holtzapple | Aug. 13, 1957 |

FOREIGN PATENTS

| | | |
|---|---|---|
| 589,938 | Great Britain | July 3, 1947 |

OTHER REFERENCES

Publication: Electronics, December 1955, page 313.